(12) United States Patent
Marcelli et al.

(10) Patent No.: US 6,233,096 B1
(45) Date of Patent: May 15, 2001

(54) PSEUDO-SPHERICAL STEPPED DIFFRACTOR CONSTRUCTED UNDER CONSTANT STEP WIDTH CONDITIONS (MULTI-STEPPED MONOCHROMATOR)

(75) Inventors: Augusto Marcelli, Frascati (IT); Alexandre V. Soldatov; Mikhail I. Mazuritsky, both of Rostova-na-Donu (RU)

(73) Assignee: Istituto Nazionale Di Fisica Nucleare, Frascati (IT)

( * ) Notice: Subject to any disclaimer, the term of this patent is extended or adjusted under 35 U.S.C. 154(b) by 0 days.

(21) Appl. No.: 09/063,482

(22) Filed: Apr. 20, 1998

(30) Foreign Application Priority Data

Jun. 11, 1997 (EP) .................................................. 97830282

(51) Int. Cl.$^7$ ............................... G02B 5/18; G21K 1/06; G01N 23/20

(52) U.S. Cl. ..................... 359/574; 359/575; 359/569; 378/84; 378/85; 378/70; 378/71

(58) Field of Search .................................... 359/569, 574, 359/566, 565, 575; 378/70, 84, 145, 85, 71

(56) References Cited

U.S. PATENT DOCUMENTS

| | | | |
|---|---|---|---|
| 4,807,268 | 2/1989 | Wittry | 378/84 |
| 4,882,780 | 11/1989 | Wittry | 378/84 |
| 5,027,377 | * 6/1991 | Thoe | 378/145 |
| 5,127,028 | * 6/1992 | Wittry | 378/84 |

OTHER PUBLICATIONS

D.B. Wittry: "Properties of curved x–ray diffractors with stepped surfaces", Journal of Applied Physics, vol. 69, No. 7, Apr. 1, 1991.

D.B. Wittry: "X–ray optics of doubly curved diffractors II", Journal of Applied Physics, vol. 71, No. 2, Jan. 15, 1992.

(List continued on next page.)

Primary Examiner—Audrey Chang
(74) Attorney, Agent, or Firm—Robert S. Lipton; Lipton, Weinberger & Husick

(57) ABSTRACT

A diffractor for electromagnetic radiation with a spherical stepped geometry constructed under the constant step width conditions (here defined as pseudo-spherical geometry). The diffractor consists of a plurality of spherically curved dispersive elements (oriented monocrystals, crystal surfaces or gratings) that are located on a focal circle. The location on the focal circle of each element is made to guarantee the same Bragg angle for the incident radiation. Thus a diffractor is an array of diffracting elements ("steps") each one contributing to the total solid angle of the diffractor, that increase the spectral output of the device without decreasing the resolution. Because the steps are spherically curved, they are curved also in the direction perpendicular to the focal circle in order to satisfy Bragg's law for diffraction over a maximum area of the diffractor. The geometry proposed for the diffractor, is defined as pseudo-spherical because the footprint of the Bragg diffraction area on each step is that of a spherical crystal, therefore superior to any alternative cylindrical, also stepped, geometries. Scheme and parameters of different devices based on the analysis of x-rays secondary are described. Indeed, many standard devices may be rebuilt using this geometry: high resolution secondary monochromators for x-ray absorption spectroscopy, extremely high resolution monochromators for hard x-ray and neutron radiation, monochromators for x-ray microanalyzer and x-ray photoelectron spectrometers for chemical analysis (ESCA).

3 Claims, 5 Drawing Sheets

OTHER PUBLICATIONS

D.B. Wittry: "Synthesis of x-ray intesity profiles for x-ray optical systems with curved diffractors", Journal of Applied Physics, vol. 74, No. 5, Sep. 1, 1993.

V. Stojanoff et al.: "A high-resolution x-ray fluorescence spectrometer for near-edge absorption studies", Review of Scientific Instruments, vol. 63, No. 1, Jan. 1992.

D.B. Wittry: "X-ray optics of doubly curved diffractors", Journal of Applied Physics, vol. 67, No. 4, Feb. 15, 1990.

D.B. Wittry: "Focusing properties of curved x-ray diffractors", Journal of Applied Physics, vol. 68, No. 2, Jul. 15, 1990.

* cited by examiner

S-RADIATION SOURCE $\alpha$ - ANGLE FOR POINT OF INTERSECTION OF A STEP CENTER WITH FOCUSING CIRCLE.

$\beta$ - ANGLE FOR POINT OF INTERSECTION OF A STEP HEIGHT WITH FOCUSING CIRCLE.

$\theta$ - BRAGG ANGLE $\Delta$ - ANGLE FOR POINT OF INTERSECTION OF A STEP BEGINNING WITH FOCUSING CIRCLE.

$\gamma$ - ANGLE FOR POINT OF INTERSECTION OF A STEP END WITH FOCUSING CIRCLE.

PSEUDO-SPHERICAL STEPPED DIFFRACTOR CONSTRUCTED UNDER CONSTANT STEP WIDTH CONDITIONS (MULTI-STEPPED MONOCHROMATOR)

FIELD OF THE INVENTION

The present invention relates to the field of electromagnetic radiation diffraction such as x-rays or neutrons. More particularly, it consists essentially of a diffractor for electromagnetic radiation based on a pseudo-spherical stepped geometry designed under the constant step width conditions.

BACKGROUND OF THE INVENTION

In many spectral devices characteristic radiation is generated by a small area of the sample surface. In such a case the source can be considered point like. In this case the conventional energy dispersive focusing technique is made either by cylindrical curved crystal (Advances in X-Ray Spectroscopy, Eds. C. Bonnelle, C. Mande, (Oxford, U.K., 1982)) or by doubly curved, on spherical or toroidal surfaces, crystal monochromators (U.S. Pat. No. 4,882,780; U.S. Pat. No. 4,807,268). These diffractors focus the monochromatic radiation onto the entrance detector slit. According to the Bragg's equation, the spectral resolution $\Delta\lambda/\lambda$ depends both on $\theta$ and $\Delta\theta$:

$$\Delta\lambda/\lambda = \Delta\theta/\tan\theta \qquad (1)$$

The intensity of the monochromatic radiation is proportional to the area of the diffractor surface, that reflects x-rays under the given Bragg's angle $\theta$ within the range $\pm\Delta\theta$. However, increasing the reflecting area, a widening of the aperture ratio of the diffractor occurs associated to a simultaneous decrease of the spectral resolution.

In the last decade analytical investigations of the shape and size of the reflecting area of a crystal-monochromator surface, employing different focusing methods have been carried out (D. B. Wittry and S. Sun, J. Appl. Phys. 67, 1633 (1990); D. B. Wittry and S. Sun, J. Appl. Phys. 68, 387 (1990); D. B. Wittry and S. Sun, J. Appl. Phys. 69, 3886 (1991); D. B. Wittry and S. Sun, J. Appl. Phys. 71, 564 (1992); W. Z. Chand and D. B. Wittry, J. Appl. Phys. 74, 2999 (1993)). Indeed, x-ray diffractors with double curved crystal provide significantly greater aperture ratio compared to that based on the cylindrical Johann or Johannson geometries. For such devices assuming an incidence angle $\theta>20°$ and a crystal height of $L<0.1R$, the reflecting surface projection on the XZ plane is rectangular and the projection on the focal circle plane (XY plane) is an arc of radius $R=2r$, where r is the focal circle radius. The knowledge of the shape of the reflecting surface allows an estimation of the parameters of a spherical diffractor designed with a stepped surface (D. B. Wittry and S. Sun, J. Appl. Phys. 69, 3886 (1991)) and in the case of constant step height, the aperture of this diffractor is larger than a spherical curved crystal.

SUMMARY OF THE INVENTION

An aim of the invention is to provide a diffractor specially dedicated to the x-rays range, based on a pseudo-spherical geometry directed to replace the plane or curved crystals in various apparatus (e.g., x-ray microanalyzer, x-ray photoelectron, spectrometer for chemical analysis, etc.).

For this purpose, the diffractor according to the present invention consists of a few small spherical curved dispersive elements (oriented crystal surfaces or gratings) that are located on a focal circle. The location on the focal circle of each element is made to guarantee the same Bragg angle for the incident radiation. Thus a diffractor according to the present invention is an array of diffracting elements ("steps"), each one contributing to the total solid angle of the diffractor, that increases the spectral output of the device without decreasing the resolution.

In the present invention a stepped diffractor is based on the physical condition that the single element of the diffractor subtends a constant angle width. With such design the efficiency of the diffractor is maximized and it is greater than both a spherical diffractor (U.S. Pat. No. 4,882,780; U.S. Pat. No. 4,807,268) and a stepped diffractor constructed under the constant step height condition (D. B. Wittry and S. Sun, J. Appl. Phys. 67, 1633 (1990)).

BRIEF DESCRIPTION OF THE DRAWINGS

The accompanying drawings, which are incorporated in and form a part of this application, illustrate the embodiments of the present invention and, together with the following detailed description, serve to explain the principles of the invention.

In the drawings.

DETAILED DESCRIPTION OF THE PREFERRED EMBODIMENT

In describing a preferred embodiment of the invention, specific terminology will be selected for the sake of clarity. However, the invention is not intended to be limited to the specific terms so selected, and it is understood that each specific term includes all technical equivalents that operate in a similar manner to accomplish a similar purpose.

Figure 1:
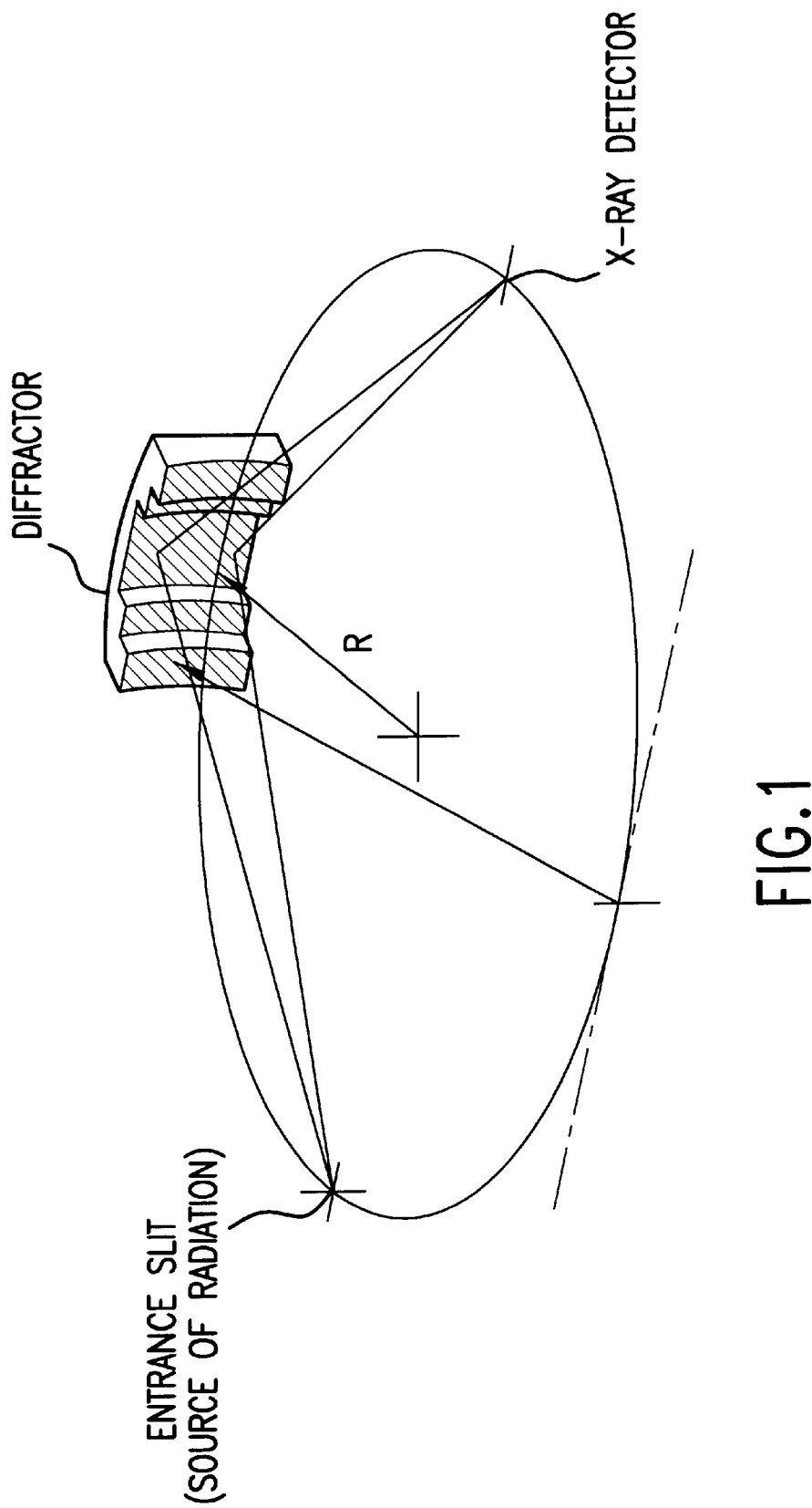
FIG. 1 is a pictorial view of a three step (because of the symmetry there are really five steps) diffractor in accordance with the present invention.

FIG. 1 shows a scheme of a three step device (actually the array is formed by five elements because of the symmetry). The shadowed areas show the reflecting surface of each step of the device placed on a Rowland circle of radius R.

Figure 2:
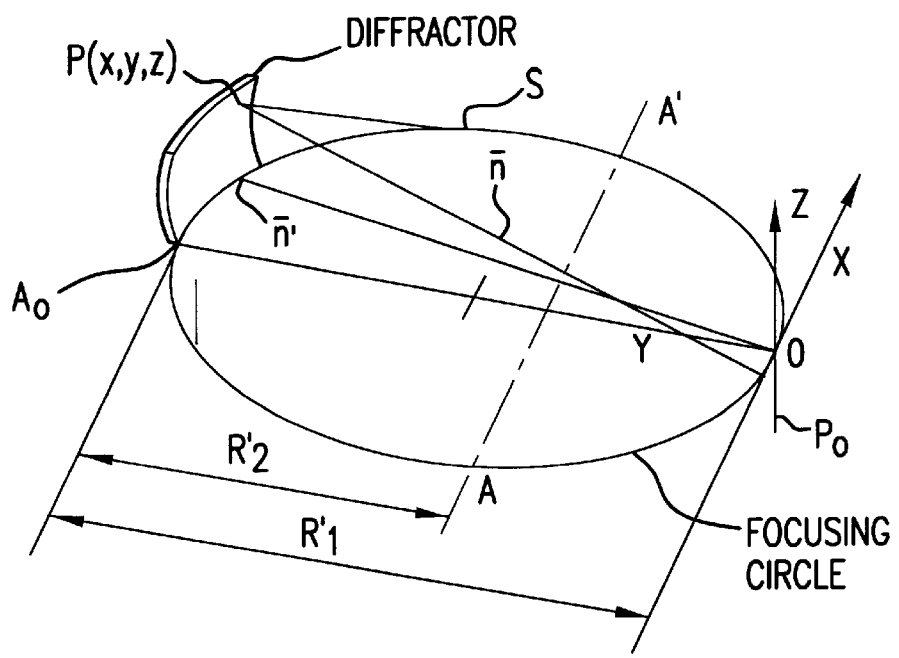
FIG. 2 is a detailed view of the upper part of a single step of the diffractor (the bottom part of a step is the same according to the symmetry with respect to the focal plane)
Figure 3:
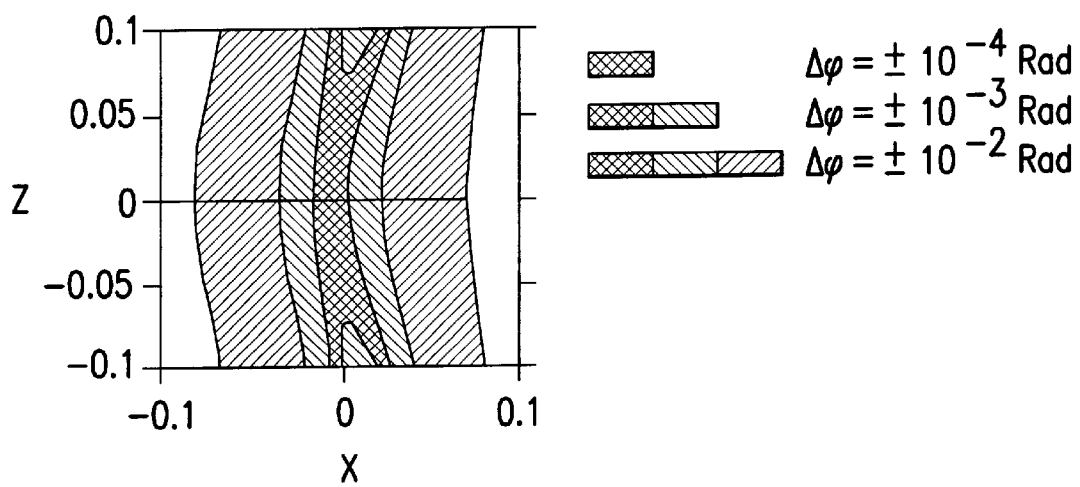
FIG. 3 is the topography of the reflecting area of the radiation focused by the diffractor surface under different Bragg angle deviation (see text)

FIG. 2 shows in more detail the upper part of a single diffracting element (step) of the diffractor (the bottom part of the step is omitted according to the fact that there is a symmetry with respect to the focal plane). In addition, FIG. 3 shows the calculated topography of the radiation focused on the diffractor surface under different Bragg angle deviations. As the deviations from the Bragg angle lead out of the Bragg's conditions, such deviations result in a lower resolution. Three areas are reported in FIG. 3 that produce different spectral resolutions (the darker area corresponds to the higher resolution). The results of FIG. 3 are very important to the understanding of the gain in the spectral output of the present device when compared with a spherical bent diffracting monocrystal like those in U.S. Pat. No. 4,882,780 and U.S. Pat. No. 4,807,268. Indeed, this figure shows that only a small region (the darkest region somewhat resembling the form of a butterfly) of the entire surface contributes to the high resolution reflection of the electromagnetic radiation. Therefore, it is necessary, in an ordinary device, to limit the reflecting area of the crystal to achieve a high spectral resolution, clearly in contrast with the need to use a large area to increase the throughput.

In the present multi-stepped geometry, the special geometric design allows to enhance the contribution of the central and best part of the topography (the dark butterfly) increasing the number of the diffracting elements. Thus we can obtain both high resolution condition for the entire surface of the diffractor, and an increase of the total solid angle.

Figure 4:
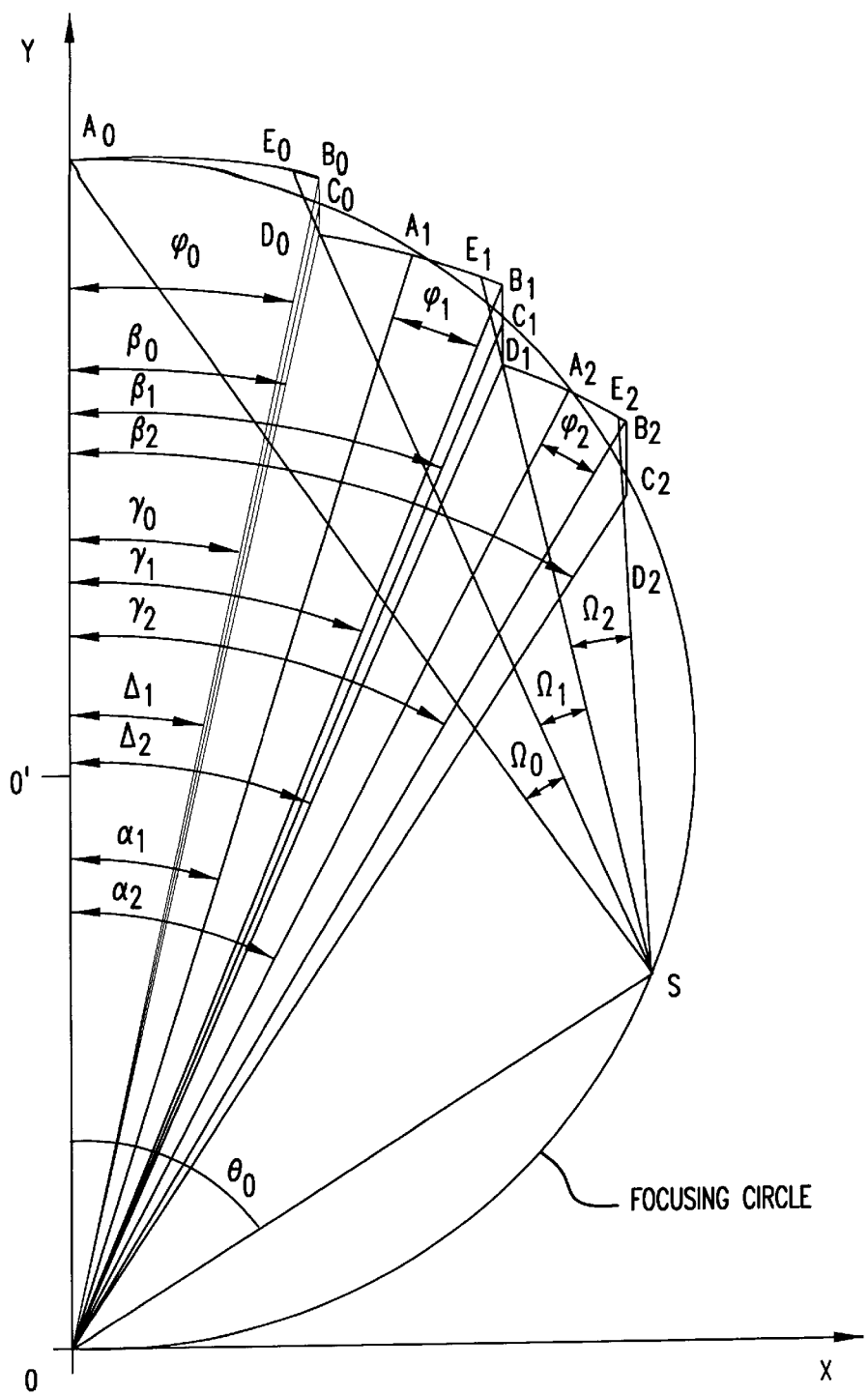
FIG. 4 is the scheme of a stepped surface diffractor under the $\phi$=constant condition ($\phi$ is the half-width angle of the i-th step) in the focusing circle plane.

FIG. 4 presents the scheme of the stepped surface diffractor in the focal plane with all parameters used of the calculation of the theoretical parameters of the device. In the XZ plane each step is a curved strip along z-axis of length L (crystal height). It lies on a spherical surface of radius $R_i$ where $R_i=OA_i$; O' is the center of the focal circle; and $h_i=B_iD_i$ is the height of the i-th step. Here $\phi$ is the half-width angle of the i-th step in the focal circle plane. In particular, $OA_0=R_0=2r$; where r is the focusing circle radius; $A_i$ is the point of intersection between the i-th step surface and the focal circle; $OA_i$ is the curvature radius of the i-th step; S is the focusing point; $E_iB_i$ is the part of the i-th step shadowed by the (i+1)-th step. In the plane of FIG. 4 the steps are shown by the arcs $2\phi_i=2(A_iB_i)$, where i=0, 1, . . . , N.

Herein below, the equations to calculate this diffractor scheme are discussed. The value of the Bragg angle deviation $\Delta\theta$ is calculated for given magnitudes of: $\lambda$, $\Delta\lambda$ and $\theta$. The initial value $\phi_0=\gamma_0$ was determined by using the equation (see D. B. Wittry and S. Sun, J. Appl. Phys. 67, 1633 (1990))

$$2\Delta\theta = X^2\cot\theta + X^3\cot^2\theta - XZ^2\cot^2\theta \quad (2)$$

Eq. (2) determines the coordinates of the boundaries of the reflection area on the spherical crystal surface. The radius $R_0=2r$ establishes the curvature of the central step. One time fixed the focal circle radius r, the parameters of the remaining steps are evaluated with the following formulae:

$$R_i = R_{i-1}\sin(\gamma_{i-1})/\sin(\Delta_i) \quad (3a)$$

$$\tan(\alpha_i) = \sqrt{(R_0^2 - R_1^2)}/R_1 \quad (3b)$$

$$\gamma_i = \alpha_i + \phi_i \quad (3c)$$

$$\phi_i = \alpha_1 + \Delta_i \quad (3d)$$

where $\alpha_i=A_0OA_i$; $\Delta_i=A_1OD_i$; $\gamma_i=A_iOB_i$ and $\phi_i=A_iOB_i(i\geq 1)$. In the present work $\Delta_i$ is evaluated by using an iterative method according to the condition $\phi$=constant. The source is placed on the focal circle and the half-width angle of the diffractor on the focal plane, excluding the areas where shadow effect occurs, is given by:

$$\Omega = 2(\Omega_0 + \Sigma\Omega_i) \quad (4)$$

where $\Omega_0=A_0SE_0$ and $\Omega_i=D_{i-1}SE_i$. Taking into account the increase of the angle width of the reflecting surface, the diffractor aperture ratio is given by the central step aperture times the factor $\Omega/\Omega_0$. The ratio $\Omega/\Omega_{sp}$ (where $\Omega_{sp}$ is the solid angle of a spherical monocrystal diffractor and $\Omega$ is the solid angle of the multi-stepped diffractor here described) is an actual estimation of the gain of this device when compared with an ideal spherical crystal device with the same focal circle and size. U.S. Pat. No. 4,882,780 and U.S. Pat. No. 4,807,268 are incorporated by reference as if both were set forth in their entirety herein.

For a better understanding of the advantages of the diffractor according to the present invention, the performances of the present device with previous stepped diffractor constructed under the constant step height conditions (D. B. Wittry and S. Sun, J. Appl. Phys. 69, 3886 (1991)) are hereinafter evaluated. In order to compare these two designs we performed calculations with the same set of parameters of D. B. Wittry and S. Sun, J. Appl. Phys. 69, 3886 (1991), i.e., focal circle radius r=50 mm, Bragg's angle $\theta$=22.76°, h=0.15 mm and central step half-width $A_0B_0$=3.87 mm. For the h=constant condition, when the step number increases its size decreases. As a consequence, a diffractor aperture based on the $\phi$=constant condition is slightly bigger. Although the number of steps are the same in both cases, for i=7, $B_x$ increases from 15.05 mm to 38.60 mm, moreover, the solid angle of the present diffractor is about 5 times larger than a stepped diffractor under constant step height conditions.

For practical applications, as already described before, a fundamental property of this device is that the increase of the aperture ratio does not determine a reduction of the resolution. Indeed, the latter combines both high aperture ration and high resolution at the same time. This really unique condition is fulfilled for different Bragg's angles and focal circle radii. In the resolution range of $5 \cdot 10^{-5} < \Delta\lambda/\lambda < 10^{-4}$ that corresponds to the range of the more recent high resolution spectrometers (V. Stojanoff, K. Hämäläinen, D. P. Siddons, J. B. Hastings, L. E. Berman, S. Cramer, G. Smith, Rev. Sci. Instrum. 63, 1125 (1992)), that also coincide with the typical silicon rocking curve width (5") in the angular range 25°<$\theta$<45°, (T. Matsushita and H.-O Hashizume, in: Handbook on Synchrotron Radiation, ed. E. E. Koch (North-Holland, Amsterdam, 1983) p. 261.) the average value of the aperture for this device is in all the range greater than 0.058 sr with fluctuations of about 15%.

Another example of x-ray monochromator based on the present type of diffractor is illustrated at the energy of the cerium (Ce) $L_2$-edge ($\lambda$=2.012 Å). With a resolution of $\approx 9*10^{-5}$ and a focal circle radius of R=400 mm, a device constructed with thin silicon (Si) (220) crystals collects a solid angle fifty times greater than a spherically curved crystal (U.S. Pat. No. 4,882,780; U.S. Pat. No. 4,807,268).

Other kind of x-ray instruments are those used as x-ray microanalyzers. The latter need a high aperture ratio but such instruments are not so demanding in resolution ($\Delta\lambda/\lambda > 10^{-3}$). Actually, in these devices the diffractor surface could use plates of muscovite (mica), which typically provides high plasticity.

A diffractor for a microanalyzer of the CAMEBAX-micro type with 160 mm focal circle radius, in the x-ray range suitable to analyze iron (Fe) (Z=26) and titanium (Ti) (Z=22), could use the muscovite crystallographic planes (311) and (201) under the Bragg's angles of 34.83° and of 32.82° respectively. With a diffractor height of L=16 mm a wide aperture (0.066 sr) associated to a moderate resolution of $\Delta\lambda/\lambda=10^{-3}$ is obtained for the first case, while in the second case an aperture of 0.039 sr and a resolution of $\Delta\lambda/\lambda=7*10^{-4}$ are calculated. The estimated gain is about 15–30 times that of the spherical diffractor of U.S. Pat. No. 4,882,780 and U.S. Pat. No. 4,807,268.

A further example of experimental apparatus which could implement the embodiment shown in FIG. 1 is an ESCA spectrometer. The characteristic radiations of the x-ray photons ($A_l$ K$\alpha$ or Mg K$\alpha$) of an x-ray photoelectron spectrometer, when absorbed by the sample, are known to induce the appearance of free photoelectrons. The intensity and the contrast of x-ray photoelectron spectra are remarkably magnified by intense incident quantum flux.

The properties of the stepped surface permit to design new kind of spectrometers that allow to obtain high contrast spectra in micro-samples. Here we report the parameters for an x-ray monochromator at the Mg K$\alpha$ energy ($\lambda$=9.89 Å). An acceptance of 0.17 sr is obtained with the following parameters: a focal circle radius of r=100 mm, a diffractor height of L=20 mm and a resolution $\Delta\lambda/\lambda=3*10^{-3}$. The x-ray beams should be diffracted by a device made again by muscovite planes (001) (2d=19.93 Å) working at $\theta$=29.90°. The diffractor should consist of only five steps, but the intensity advantage over a conventional spherical curved crystal should be larger than 30.

Figure 5:
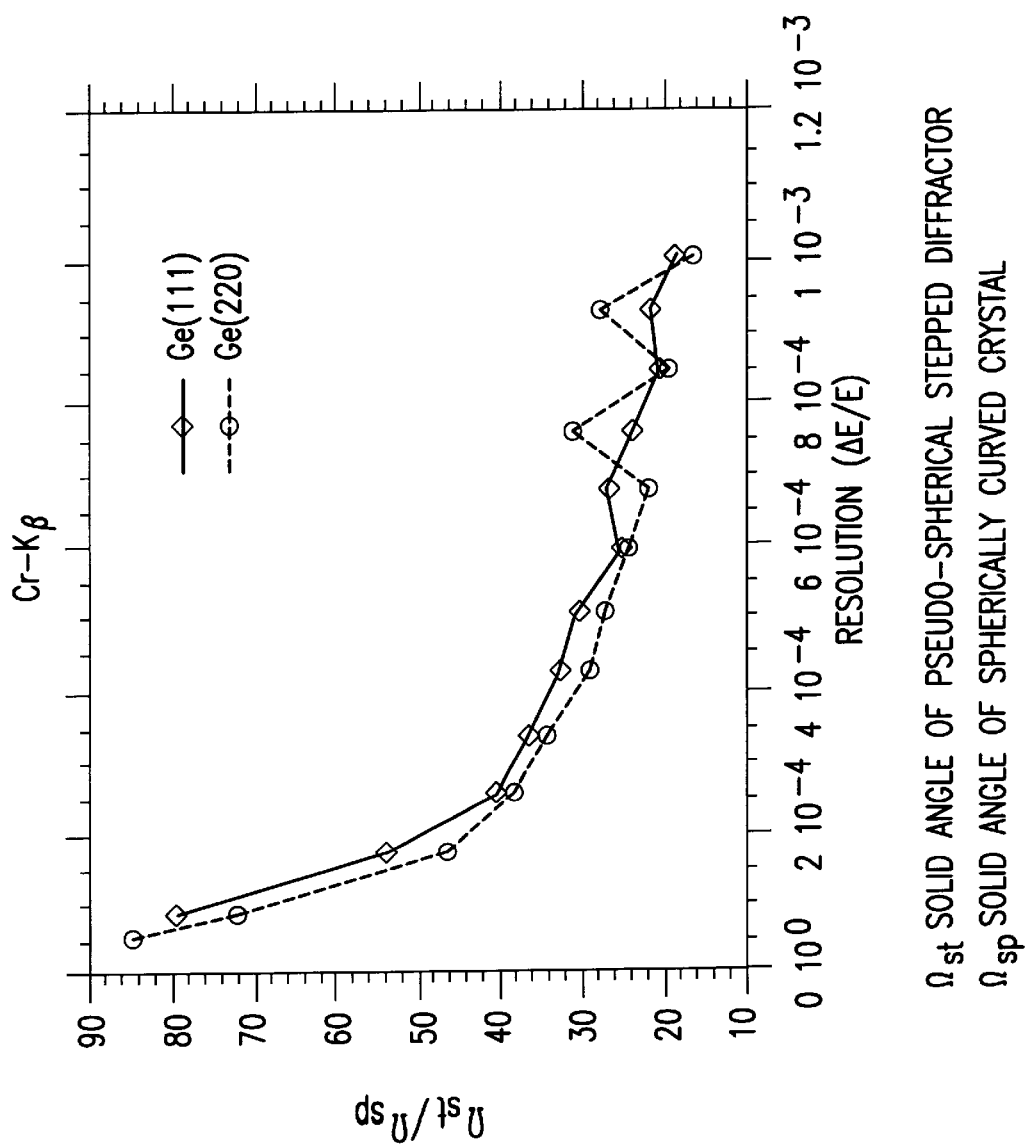
FIG. 5 is a diagram of the gain obtained by replacing a spherical diffracting crystal as that reported in the publication: "W. A. Caliebe, S. Bajt and C-C. Kao, Rev. Sci. Instrum. 67(1996) 1" with a multi-stepped diffractor using a germanium (Ge) crystal with different reflecting planes at the energy of Cr—K$\beta$.
Figure 6:
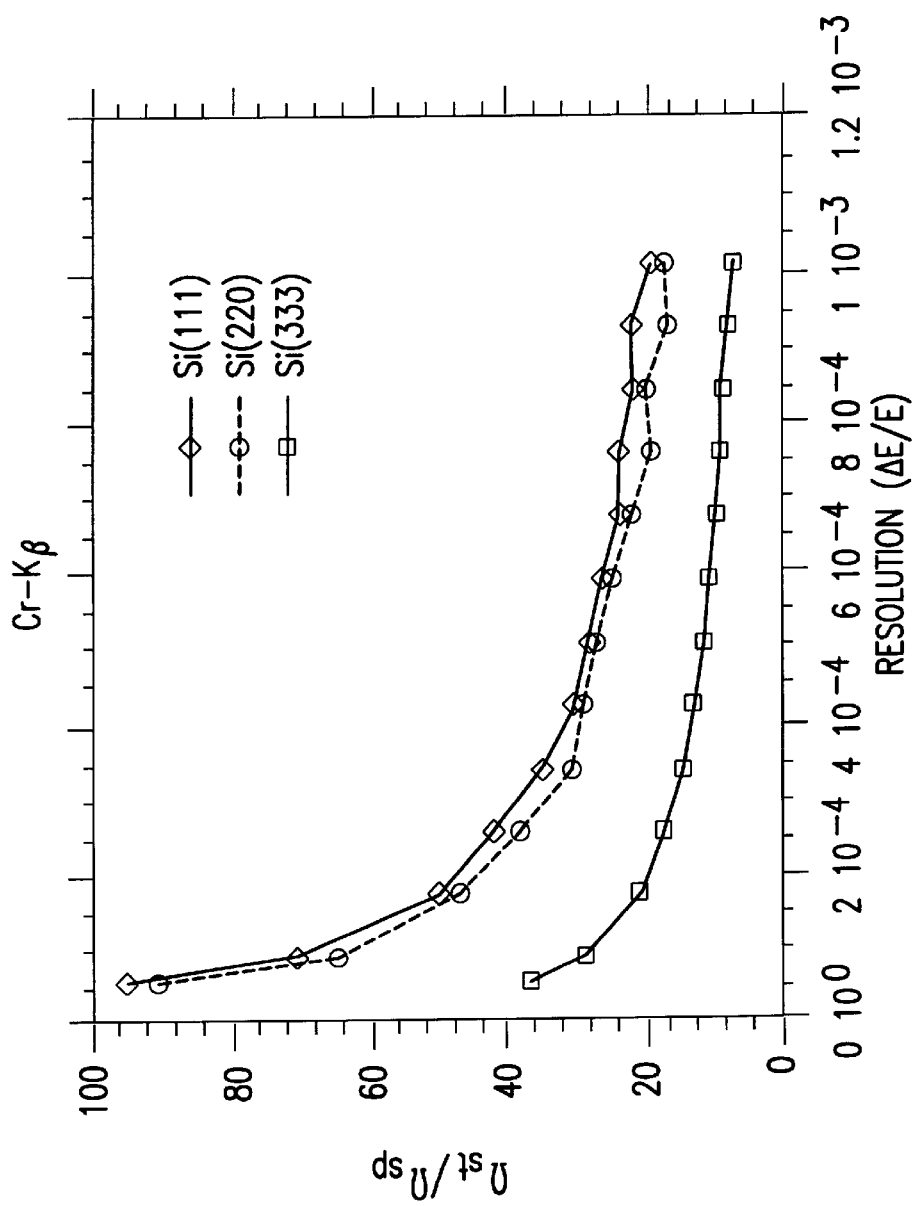
FIG. 6 is similar to the diagram of FIG. 5 replacing the Ge crystal with a silicon (Si) crystal that has different reflecting planes.

More recently a diffraction based device using spherical crystal elements was designed for high resolution x-ray fluorescence measurements in the Cr K$_\beta$ energy (W. A. Caliebe, S. Bajt and C-C. Kao, Rev. Sci. Instrum. 67(1996) 1.). In FIGS. 5 and 6 we present the comparison of the device of W. A. Caliebe, S. Bajt and C-C. Kao, Rev. Sci. Instrum. 67(1996)-1 when the spherical diffracting crystal is replaced by the multi-stepped diffractor of similar size according to the present invention. The gain here is very high over the entire range of the resolution both with Ge (FIG. 5) and Si (FIG. 6) crystals. Moreover it is very important to underline, looking at the results of these two figures, in order to achieve the larger gain one only has to use the Si(111) surface; there is no need to use higher order reflections, or other crystals and orientations with different spacing.

Another useful application of the present multi-stepped diffractor should be the replacement of the conventional curved monocrystal in laboratory EXAFS spectrometer based on x-ray diffractometer coupled to a rotating anode, like the RIGAKU one (K. Tohji, Y. Udagava, T. Kawasaki, K. Massuda, Rev. Sci. Instrum.), with a proper multi-stepped device.

Finally, it should be noted that the device according to the invention, realized locating some small spherically curved dispersive elements (monocrystals or gratings) on a focal circle and disposing said elements in a way to fulfill the same Bragg reflection condition for the incident radiation, allows advantageously to increase the throughput with respect to a spherical bent crystal device without affecting the resolution, where usually mechanical stresses disturb the performance of these devices.

Although this invention has been described and illustrated by reference to specific embodiments, it will be apparent to those skilled in the art that various changes and modifications may be made which clearly fall within the scope of this invention. The present invention is intended to be protected broadly within the spirit and scope of the appended claims.

We claim:

1. A diffractor for electromagnetic radiation, particularly suitable for x-ray radiation, the diffractor comprising:

a plurality of dispersive elements having a multi-stepped geometry such that each step has a generally spherical curvature but a different radii than all other steps and having constant angle step width.

2. The diffractor for electromagnetic radiation according to claim 1, wherein said dispersive elements (monocrystals or gratings) are spherically curved and positioned on a focal circle, each element being shifted in a way to fulfill the same Bragg reflection condition for the incident radiation.

3. The diffractor for electromagnetic radiation according to claim 1, wherein the diffractor is enhanced by increasing the number of the dispersive elements, thereby obtaining both a high resolution condition over the entire surface of the diffractor, and an increase of the total solid angle.

* * * * *